UNITED STATES PATENT OFFICE.

JOHN A. JUST, OF SYRACUSE, NEW YORK, ASSIGNOR OF ONE-HALF TO D. H. BURRELL & COMPANY, OF LITTLEFALLS, NEW YORK, A FIRM.

BAKING-POWDER.

SPECIFICATION forming part of Letters Patent No. 692,452, dated February 4, 1902.

Application filed June 10, 1901. Serial No. 63,996. (No specimens.)

*To all whom it may concern:*

Be it known that I, JOHN A. JUST, a citizen of the United States, and a resident of Syracuse, in the county of Onondaga and State of New York, have invented a new and useful Improvement in Baking-Powders, of which the following is a specification.

The object of this invention is to utilize phosphoric acid as an acid ingredient in baking-powders. I have found that this acid can be satisfactorily employed for this purpose by combining it with casein in such proportion that a product is formed which is stable and non-hygroscopic and which is so acid in its action that it liberates a large percentage of gas from a gas-producing salt, such as bicarbonate of soda.

In practicing my invention I proceed as follows: The phosphoric acid which is employed may be produced in any well-known manner—for instance, by decomposing tricalcic or monocalcic phosphate by sulfuric acid—or it may be commercial phosphoric acid. The casein is produced in any suitable manner—for instance, by precipitating the curd from skim-milk by a suitable acid, separating the curd from the whey, and washing out the impurities. A caseinate, such as a compound of casein and an alkali or alkaline earth, may also be employed. I incorporate sufficient phosphoric acid with casein or a caseinate to insure sufficient acidity in the final compound. A satisfactory proportion is from twenty-three to twenty-five parts, by weight, of phosphoric acid to from seventy-seven to seventy-five parts of casein, or approximately twenty-four parts, by weight, of phosphoric acid and seventy-six parts of casein or caseinate.

The preferred method of manufacturing the composition is as follows: I form an aqueous solution of phosphoric acid and introduce into the solution casein or caseinate to the amount of from twenty-five to fifty per cent., by weight, of the phosphoric acid contained in the solution. The mixture is heated until the curdy condition of the casein disappears and the mixture assumes a uniform fluid condition. It is then concentrated to a syrupy consistency. The remainder of the necessary amount of casein or caseinate is then added and the ingredients are thoroughly mixed and united, preferably by grinding the mixture to a uniform moist mush-like consistency. The composition is then dried in a current of hot air or by other suitable means in such a way that the product is not discolored or injured and is ground to a fine powder. The intimate union of the phosphoric acid and casein during the gradual concentration of the mixture and during the grinding and drying thereof removes the changeable and hygroscopic qualities of the phosphoric acid and produces a dry and stable compound. The latter contains a much larger proportion of phosphoric acid than would be contained in acid phosphate of casein. This compound, which may be designated as a "hyperphosphate of casein," yields with its equivalent of bicarbonate of soda about seventeen per cent. of gas and forms a very desirable acid ingredient for baking-powder. When mixed with water, this compound swells up and dissolves slowly.

The following is an illustration of a satisfactory baking-powder mixture containing this improved acid ingredient: One hundred and ninety-six parts, by weight, of phosphoric acid are combined with six hundred and sixteen parts of casein, producing eight hundred and twelve parts of the acid compound. About eight hundred parts of this compound are mixed with four hundred and ninety parts of bicarbonate of soda, forming a mixture which yields about seventeen per cent. of gas. The usual amount of an inert filler, such as starch, is added for producing a baking-powder of the usual commercial strength. The foregoing proportions are given as an illustration and may be varied as circumstances may require.

The residues produced by a baking-powder of this composition are entirely unobjectionable.

I do not wish to claim in this application the herein-described compound of casein and phosphoric acid or the method of making the same, because these inventions are claimed in a separate application for patent filed by me on the 30th day of September, 1901, Serial No. 77,137, as a subdivision of this application.

I claim as my invention—

1. The herein-described highly-acid composition of matter consisting of phosphoric acid and casein, containing phosphoric acid largely in excess of the amount which is contained in acid phosphate of casein and being dry, non-hygroscopic and soluble in water.

2. The herein-described composition of matter consisting approximately of twenty-four parts, by weight, of phosphoric acid and seventy-six parts of casein.

3. A baking-powder composed of a carbonate, a filler and the herein-described composition of casein and phosphoric acid, containing phosphoric acid largely in excess of the amount which is contained in acid phosphate of casein and being dry, non-hygroscopic, and soluble in water.

4. A baking-powder composed of a carbonate, a filler and the herein-described composition of casein and phosphoric acid, composed approximately of twenty-four parts, by weight, of phosphoric acid and seventy-six parts of casein.

Witness my hand this 7th day of June, 1901.

JOHN A. JUST.

Witnesses:
 DANIEL H. STRACHAN,
 THOS. J. MOLLOY.